US 7,136,897 B1

(12) United States Patent
Raghunandan

(10) Patent No.: US 7,136,897 B1
(45) Date of Patent: Nov. 14, 2006

(54) MINIMIZING ELECTRONIC MAILBOX CONGESTION

(75) Inventor: Hulikunta Prahlad Raghunandan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 09/643,443

(22) Filed: Aug. 22, 2000

(51) Int. Cl.
*G06F 15/16* (2006.01)
*G06F 15/173* (2006.01)

(52) U.S. Cl. ............... 709/206; 709/223; 709/236; 709/247

(58) Field of Classification Search ........ 709/206–207, 709/224, 223, 236, 247; 711/154, 156, 170–173
See application file for complete search history.

(56) References Cited

U.S. PATENT DOCUMENTS

| | | | | |
|---|---|---|---|---|
| 5,506,872 A | * | 4/1996 | Mohler | 375/240 |
| 5,930,337 A | * | 7/1999 | Mohler | 379/88.22 |
| 6,073,165 A | * | 6/2000 | Narasimhan et al. | 709/206 |
| 6,282,565 B1 | * | 8/2001 | Shaw et al. | 709/206 |
| 6,324,569 B1 | * | 11/2001 | Ogilvie et al. | 709/206 |
| 6,396,513 B1 | * | 5/2002 | Helfman et al. | 715/752 |
| 6,421,707 B1 | * | 7/2002 | Miller et al. | 709/206 |
| 6,941,304 B1 | * | 9/2005 | Gainey et al. | 707/10 |

* cited by examiner

*Primary Examiner*—Bunjob Jaroenchonwanit
*Assistant Examiner*—Ramsey Refai
(74) *Attorney, Agent, or Firm*—Anthony V. S. England; T. Rao Coca

(57) ABSTRACT

A method of receiving and processing e-mail includes monitoring available space in an electronic mailbox and, upon predetermined space related parameters being met, applying compression and/or truncation rules to incoming e-mail. The rules are related to predetermined threshold levels such that different steps or levels of compression and/or truncation are applied to incoming e-mails and/or attachments as the predetermined threshold levels are reached or exceeded. The threshold levels are related to the amount free of storage capacity allocated to the mailbox, and as the free space is used up, the degrees of compression and truncation are progressively increased.

17 Claims, 2 Drawing Sheets

MINIMIZING ELECTRONIC MAILBOX CONGESTION

BACKGROUND OF THE INVENTION

This invention relates to minimising electronic mail (e-mail) losses due to congestion or to a lack of user space at a user's mailbox.

FIELD OF THE INVENTION

E-mail is now a very commonly used way of sending and receiving information. E-mail may be sent between users on a local area network or a wide area network across the Internet for example.

E-mail usage continues to increase and it is not uncommon for a e-mail user to receive many hundreds of messages in a day. Many of these messages may themselves have lengthy attachments or ones which needs a great deal of storage space such as graphics files. In addition, there is growth in volume of spam mail which is unsolicited (predominantly unwanted) e-mail and which also serves to fill up a user's mailbox. When a mailbox runs out of user space to store incoming mail, existing e-mail systems simply then bounce the mail back to the sender indicating that this mail was not delivered. There is, however, no way that the receiver knows that a mail delivery failed. Thus, an important e-mail could be missed and the receiver does not know this. This could have potentially disastrous consequences in business for example.

In cases where the mail sent is large in size (perhaps due to attachments) the e-mail software does not deliver mail if the user space available is less than the mail size even if the amount of user space available is substantial.

The present invention arose in attempt to alleviate the above problems.

According to the present invention in a first aspect there is provided a method of receiving and processing e-mail, comprising monitoring available space in an electronic mailbox and, upon predetermined space-related parameters being met, applying compression and/or truncation rules to incoming e-mail.

Preferably, the rules are related to predetermined threshold levels such that different steps of compression and/or truncation are applied to incoming e-mails and/or attachments as they are reached or exceeded.

Preferably, after a first predetermined threshold level, all subsequent incoming mail is compressed and stored.

Preferably, on reaching a second predetermined threshold level, any attachments are truncated, in addition to e-mail messages being compressed.

Preferably, on reaching a further predetermined threshold level, in addition to truncation of attachments, the body contents of the e-mail are truncated and only data concerning the e-mail is stored.

This data may comprise, for example, information regarding the sender, path taken by the message, date/time, subject, priority, number of attachments and/or number of bytes of body content that was truncated.

When e-mail messages are accessed for viewing or printing by the user, any compressed messages are uncompressed and displayed in full.

The use of techniques, according to the present invention, of systematic truncation and compression, enables lesser loss to the receiver by way of lost e-mail. The user can take appropriate remedial corrective action and communicate with senders for any important messages or data that he/she would want to receive but has not received in full or only received in a truncated form, since essential information identifying the sender at least is still retained.

Many different methods of compression are well known in the art.

According to the present invention in a further aspect there is provided a computer program with a electronic inbox, and provided with means for compressing and/or truncating incoming e-mails according to predetermined parameters relating to space available in the inbox are met.

According to the present invention in a further aspect there is provided an e-mail server comprising one or more e-mail inboxes and means for applying predetermined compression and/or truncation rules according to space parameters.

The invention may further comprise means for notifying users that compression and/or truncation has been begun to take place, so that the user can take action such as deleting old e-mail messages, or moving them to other folders on his computer, so as to free up space.

Embodiments of the invention will now be described, by way of example only, with reference to the accompanying drawings, in which:

DESCRIPTION OF THE PREFERRED EMBODIMENTS

The invention will be described in relation to a dial-up Internet e-mail system, but is also applicable to permanent ('always-on') connections and to e-mail systems to LANs, WANs, etc.

Figure 1:
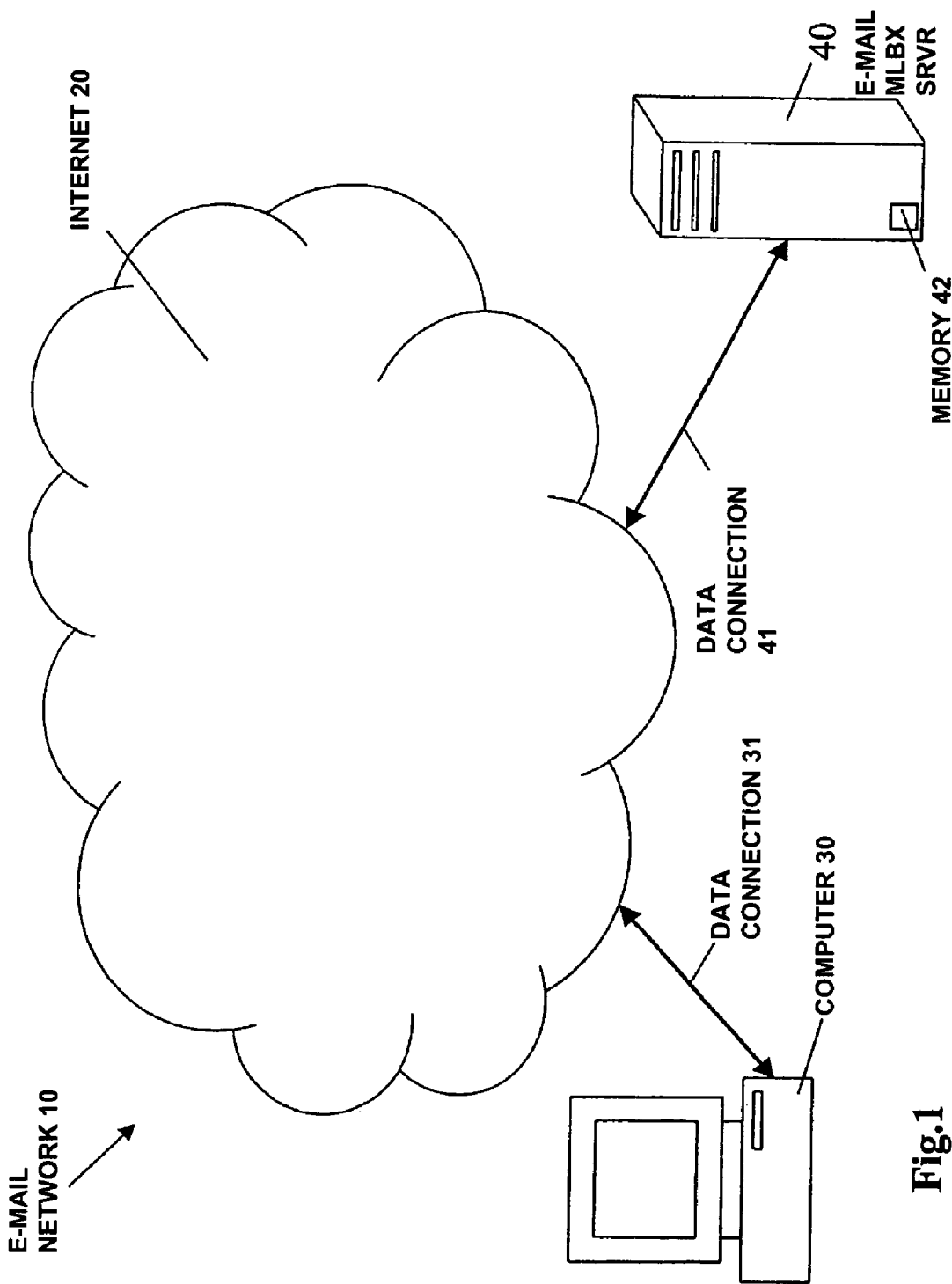
FIG. 1 is a computer e-mail network.

As shown in FIG. 1, a computer e-mail network 10 includes a computer 30 communicable with an e-mail mailbox server 40 over the Internet 20 via data connections 31 and 41. The e-mail server generally allocates a maximum size (say 10 MB) to each mailbox.

A user (not shown), wishing to send or receive e-mail, dials up an ISP (not shown) from the computer 30. Once a connection to the ISP has been established, the user can request that any previously unsent e-mail messages currently stored in their mailbox (not shown) are downloaded to the computer 30. Messages are downloaded via the data connection 41, Internet 20 and the data connection 31.

Downloaded messages received at the computer 30 are decoded in the normal way by a proprietary (client) e-mail program. In a preferred system, the mailbox is continuously and dynamically assessed to determine the level of user mailbox storage space remaining within the server 40. This level is continually checked by the server 40 and is represented by an updated level indicator stored in a memory 42 in the server 40. Advantageously, the user can pre-set various threshold levels that are also stored in the memory in the server 40. Alternatively, these levels can be set by the server, or by the ISP, or otherwise. These pre-set threshold levels determine which of the processing steps as shown in the flowchart of FIG. 2 are executed, and are chosen to meet the user's requirements.

Figure 2:
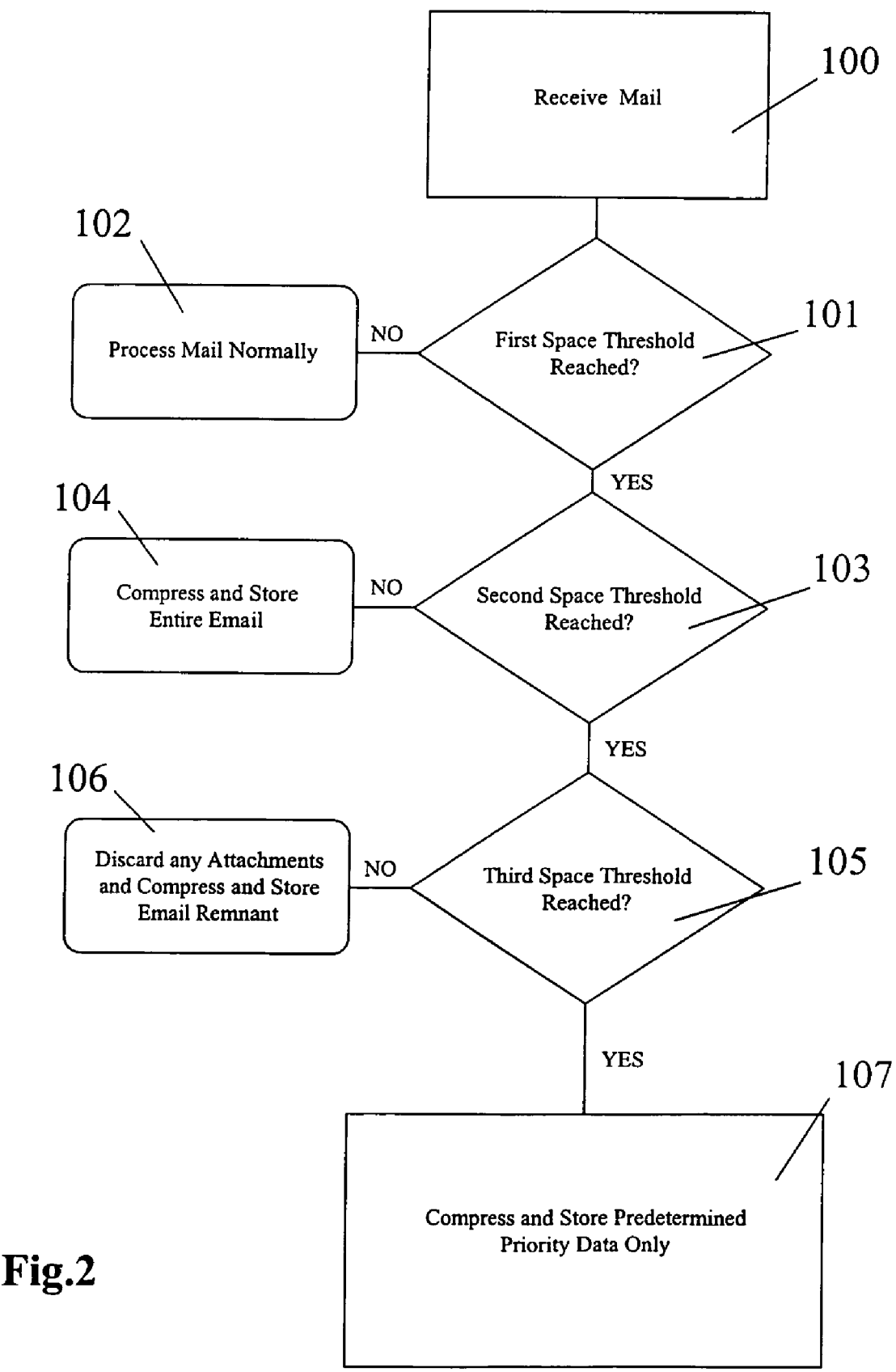
FIG. 2 is a flowchart showing the steps of a preferred method of minimising electronic mailbox congestion.

FIG. 2 is a flowchart showing the steps of a preferred method of minimising electronic mailbox congestion. The server 40 initially receives an e-mail message (step 100) and then compares the current level indicator with a first threshold level pre-set by the user. The threshold level is, for example, a proportion of the total available disk space allocated to that user on the server.

If the first threshold has not been exceeded, then the full incoming e-mail message, and any attachments, is stored in the mailbox server 40 in the usual way (step 102). If, however, the threshold has been reached or exceeded, then the level indicator is compared with a second threshold level (step 103). If the second threshold has not been exceeded, the incoming e-mail, including any attachments, is compressed using a known data compression program, for example a zip type program, and the compressed version stored in the mailbox for future retrieval (step 104). In circumstances where the second threshold has been exceeded also, the level indicator is compared with a third threshold level (step 105).

When the first and the second, but not the third, thresholds have been exceeded, only the message portion of the e-mail is compressed and stored (step 106). Any attachments are returned to the sender in the conventional manner.

When the third threshold has been exceeded, a set of predetermined message details only is stored in a compressed format in the mailbox (step 107). This set may comprise the sender's name and e-mail address, the date and time the message was sent, and the size (including any attachments) of the message. These details can generally be found on the header to an e-mail message. However, the particular details of an e-mail message to be stored are determined by the user or system as appropriate. In this case, the actual message and any attachments are not stored on the recipient's (or server) mailbox, rather they are returned to the sender in the usual manner. Thus, only essential information is stored which occupies a minimal amount of valuable user storage space.

In an example of the above, the threshold levels are as follows:

| | |
|---|---|
| Total allocated user disk space: | 10 MB. |
| First threshold: | 90% full or 1 MB free. |
| Second threshold: | 95% full or 0.5 MB free. |
| Third threshold: | 99% full or 0.1 MB free. |

The Reader will be aware that these levels are purely notional, and that in practice levels will be set by a user as required.

In the example above, when the user disk space is 90% full, the server 40 will issue a message to the user stating that data compression will be applied to any future e-mails until the user either alters threshold levels, or reduces the amount of stored data to a level below the 90% full threshold. In this way, the user has control over the manner in which his or her storage space is used. Similarly, a message may be issued to a user as each threshold is reached.

Whilst the above refers to a mailbox provided at a server, the invention is equally applicable to a local mailbox and software at a users PC, PDA, other computer, or even on a mobile telephone or other terminal.

The invention claimed is:

1. A method of receiving and processing email comprising:
 monitoring available space in an electronic mailbox and upon predetermined space-related parameters being met, applying compression and truncation rules to all subsequent incoming email thereafter; wherein said predetermined space-related parameters are related to predetermined threshold levels such that different steps of compression and truncation are applied to said all subsequent incoming email and any attachments as said predetermined threshold levels are reached;
 wherein
 after a first predetermined threshold level is reached, all subsequent incoming email thereafter is compressed and stored;
 after a second predetermined threshold level is reached, all subsequent incoming e-mail thereafter is compressed and stored and any attachments are truncated; and
 after a third predetermined threshold level is reached, body contents of and any attachments on all subsequent incoming mail thereafter are truncated, and only selected data concerning said all subsequent incoming email is stored in a compressed format.

2. A method as claimed in claim 1, wherein said selected data includes information regarding the sender of each such subsequent incoming email, information regarding a path taken by the incoming email, date, time, subject, priority, number of attachments or number of bytes of said body contents that was truncated.

3. A method as claimed in claim 1, wherein said predetermined threshold levels are related to the amount of free storage capacity allocated to said electronic mailbox.

4. A method as claimed in claim 1 wherein when an incoming e-mail from among said all subsequent incoming e-mail is accessed for viewing or printing by a user, any compressed part of said incoming e-mail is uncompressed and the incoming e-mail is displayed in full.

5. A method as claimed in claim 1 wherein as said available space in an electronic mailbox is freed up and said predetermined threshold levels are no longer reached, the compression and/or truncation relating to that predetermined threshold level is no longer applied.

6. Apparatus for use with an email system comprising:
 means for providing an electronic mailbox; and
 means for compressing and truncating incoming email according to predetermined parameters relating to space available in the electronic mailbox, said predetermined parameters being related to predetermined threshold levels wherein different steps of compression and truncation are applied to all subsequent incoming email and any attachments as said predetermined threshold levels are reached;
 wherein
 after a first predetermined threshold level is reached, all subsequent incoming email thereafter is compressed and stored;
 after a second predetermined threshold level is reached, all subsequent incoming e-mail thereafter is compressed and stored and any attachments are truncated; and
 after a third predetermined threshold level is reached, body contents and any attachments on all subsequent incoming mail thereafter are truncated, and only selected data concerning said all subsequent incoming email is stored in a compressed format.

7. Apparatus as claimed in claim 6, wherein the apparatus is a computer, a computer server, a personal digital assistant (PDA), or a mobile telephone.

8. Apparatus as claimed in claim 6, further operable to notify a user that storage space reduction has begun to take place.

9. An email server including a memory for providing allocated space for at least one electronic mailbox; and means for applying compression and truncation rules to all subsequent incoming email thereafter according to predetermined parameters; wherein said predetermined parameters are related to predetermined threshold levels wherein different steps of compression and truncation are applied to said all subsequent incoming email and any attachments as said predetermined threshold levels are reached;
 wherein
  after a first predetermined threshold level is reached, all subsequent incoming email thereafter is compressed and stored;
  after a second predetermined threshold level is reached, all subsequent incoming e-mail thereafter is compressed and stored and any attachments are truncated; and
  after a third predetermined threshold level is reached, body contents and any attachments on all subsequent incoming mail thereafter are truncated, and only selected data concerning said all subsequent incoming email is stored in a compressed format.

10. An apparatus as claimed in claim 6, wherein said data selected data includes information regarding the sender of each such subsequent incoming email, information regarding a path taken by the incoming email, date, time, subject, priority, number of attachments or number of bytes of said body contents that was truncated.

11. An apparatus as claimed in claim 6, wherein said predetermined threshold levels are related to the amount of free storage capacity allocated to said electronic mailbox.

12. An apparatus as claimed in claim 6 wherein when an incoming e-mail from among said all subsequent incoming e-mail is accessed for viewing or printing by a user, any compressed part of said incoming e-mail is uncompressed and the incoming e-mail is displayed in full.

13. An apparatus as claimed in claim 6 wherein as said available space in an electronic mailbox is freed up and said predetermined threshold levels are no longer reached, the compression and/or truncation relating to that predetermined threshold level is no longer applied.

14. An e-mail server as claimed in claim 9, wherein said data selected data includes information regarding the sender of each such subsequent incoming email, information regarding a path taken by the incoming email, date, time, subject, priority, number of attachments or number of bytes of said body contents that was truncated.

15. An e-mail server as claimed in claim 9, said predetermined threshold levels are related to the amount of free storage capacity allocated to said electronic mailbox.

16. An e-mail server as claimed in claim 9 wherein when an incoming e-mail from among said all subsequent incoming e-mail is accessed for viewing or printing by a user, any compressed part of said incoming e-mail is uncompressed and the incoming e-mail is displayed in full.

17. An e-mail server as claimed in claim 9 wherein as said available space in an electronic mailbox is freed up and said predetermined threshold levels are no longer reached, the compression and/or truncation relating to that predetermined threshold level is no longer applied.

* * * * *